Jan. 11, 1927.
H. C. GOETTING
1,613,653
COLLAR
Filed May 20, 1925
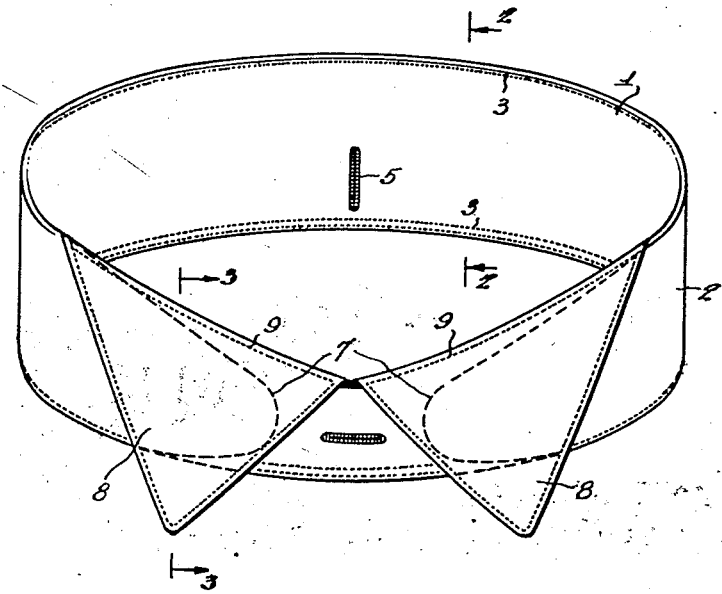
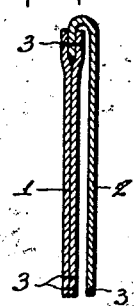
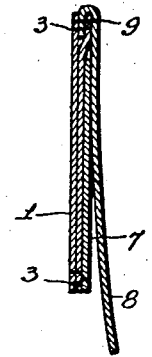
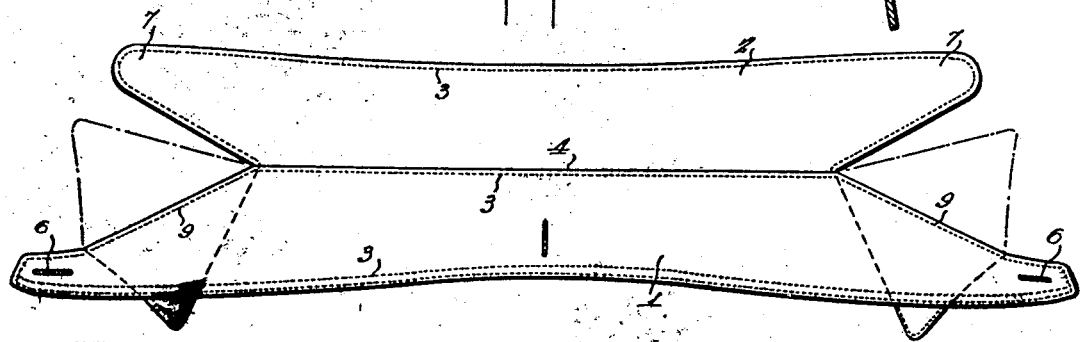
WITNESSES
INVENTOR
Henry C. Goetting,
BY
ATTORNEYS Patented Jan. 11, 1927.

1,613,653

UNITED STATES PATENT OFFICE.

HENRY CHRISTIAN GOETTING, OF NEW YORK, N. Y.

COLLAR.

Application filed May 20, 1925. Serial No. 31,569.

This invention relates to collars and more particularly to collars of the semi-soft type, although it is obvious that the invention is applicable to soft collars or stiff collars, the primary object of the invention being to provide a turnover collar having wings at the front and yet which provides an enclosure for that portion of the tie which extends around the collar, and gives a neat and attractive appearance when in use.

A further object is to provide a collar of the turnover, stand-up type, having wings at the front.

With these and other objects in view, the invention consists in certain novel features of construction and combinations and arrangements of parts, which will be more fully hereinafter described and pointed out in the claim.

In the accompanying drawings—

Figure 1 is a perspective view of my improved collar;

Figure 2 is an exaggerated view in section on the line 2—2 of Figure 1;

Figure 3 is an exaggerated view in section on the line 3—3 of Figure 1;

Figure 4 is a plan view of the collar flattened out.

My improved collar is of the turnover type, comprising an inner neckband portion 1 and an outer exposed section 2. These sections may be made of any suitable thickness or thicknesses of material. I have illustrated the collar band portion 1 as of two thicknesses, and the outer portion 2 of a single thickness, but it is obvious that I may employ any desired thicknesses of material with the several thicknesses secured together by lines of stitching 3.

The collar is folded along the line 4 so that the outer portion 2 will lie against the inner portion 1 but will provide ample space for a necktie to slide freely thereon. This inner portion 1 is provided with a suitable buttonhole 5 at the back of the collar and with buttonhole tabs 6 at the front of the collar to attach the same in the ordinary manner.

I would call particular attention to the shape of the extremities of the outer portion 2. These extremities form tongues 7 which are integral with the collar but which taper, as indicated most clearly in Figures 1 and 4.

The inner portion 1 of the collar is provided adjacent its front end at its upper edge with wings 8, 8. These wings are made integral with or constitute a fixed part of the inner portion 1 of the collar, and may be of any desired size and shape, and are folded outwardly and secured to the inner portion 1 by lines of stitching 9.

It is to be understood that these lines of stitching 9 extend through the inner portion 1 and also through the wings 8 so that the wings are maintained properly folded yet are free at their lower portions and capable of being bent outwardly so as to allow the tongues or extremities 7 of the outer portion of the collar to rest under the same and be held under the wings so as to prevent said extremities from outward swinging movement.

The collar may be laundered flat, as shown in Figure 4, and folded as indicated in Figure 1 for use.

The ordinary necktie (not shown) is positioned between the inner and outer portions 1 and 2, and that portion of the tie which goes around the collar is entirely hid, so that I provide a collar which has all of the attractive appearance of a wing collar combined with the attractiveness of a turnover collar which hides that portion of the necktie around the collar.

Various slight changes and alterations might be made in the general form of the parts described without departing from my invention and hence I do not limit myself to the precise details set forth but consider myself at liberty to make such slight changes and alterations as fairly fall within the spirit and scope of the appended claim.

I claim:

As a new article of manufacture, a turnover collar, having inner and outer members or portions, wings at the front of the collar secured to the inner member of the turnover collar at its forward ends and folded downwardly, a line of stitching extending through the downwardly extended wings and through the inner member of the collar, holding the wings in their normal set position, the outer portion of the turnover collar being appreciably shorter than the inner portion of said collar and adapted to lie under and be hidden by the wings.

HENRY CHRISTIAN GOETTING.